Dec. 16, 1924.
H. S. GINGRICH
SPEEDOMETER DRIVE
Filed Nov. 28, 1923 — 3 Sheets-Sheet 1
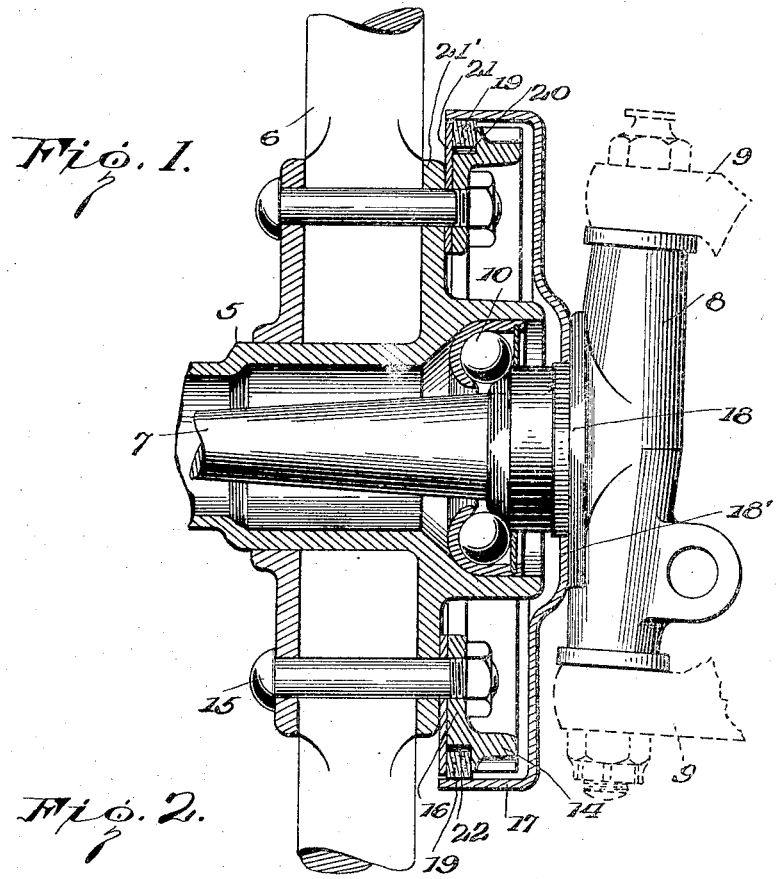
Fig. 1.
Fig. 2.
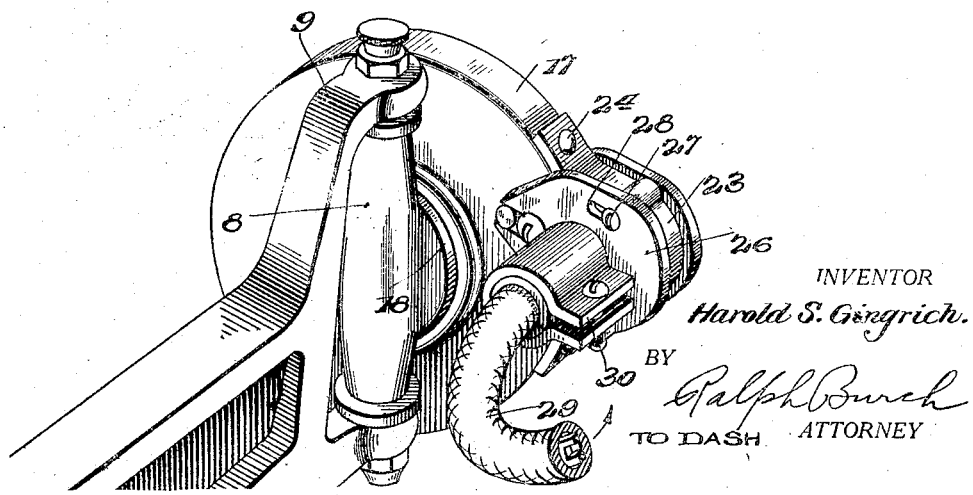
INVENTOR
Harold S. Gingrich.
BY
Ralph Burch
ATTORNEY

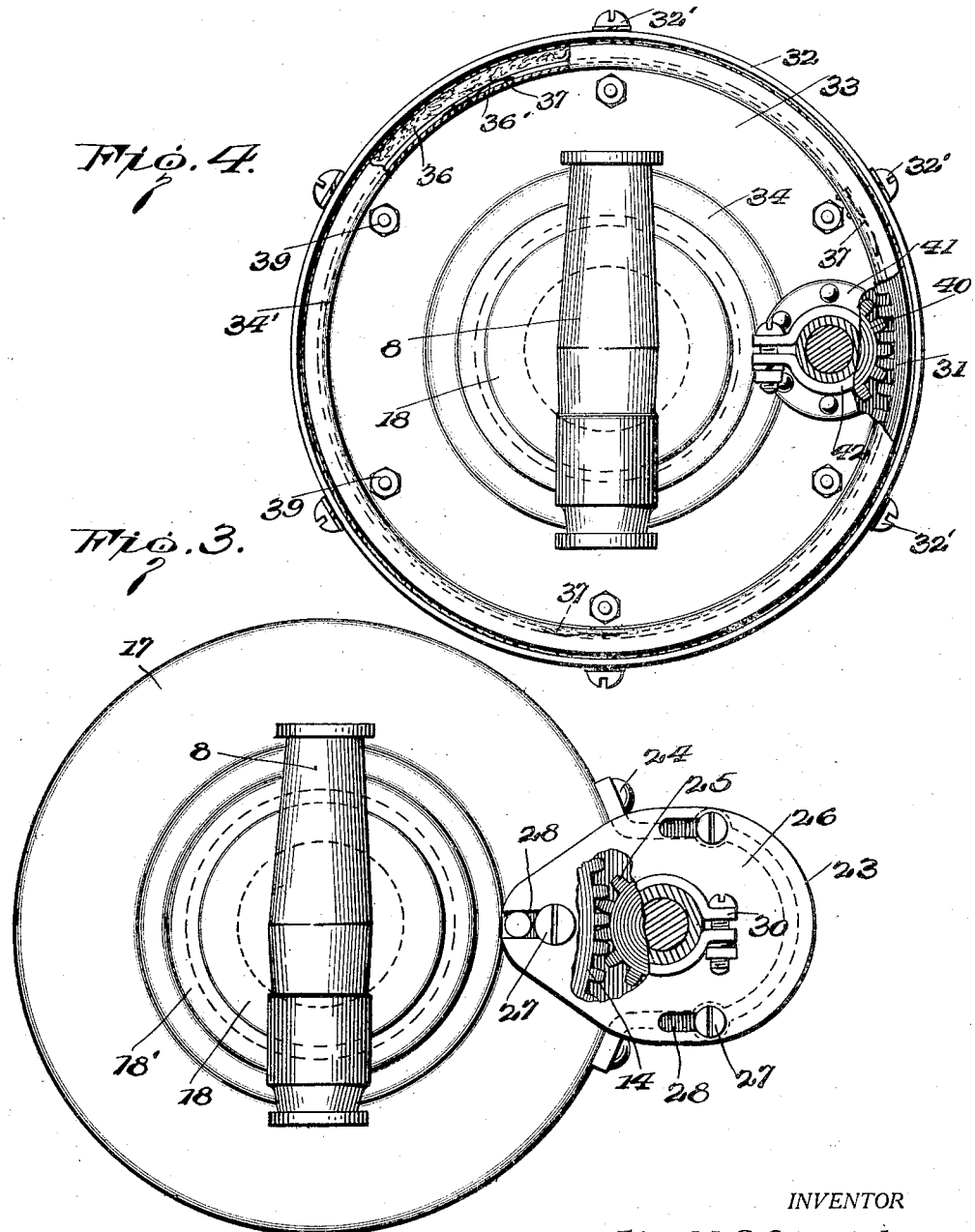

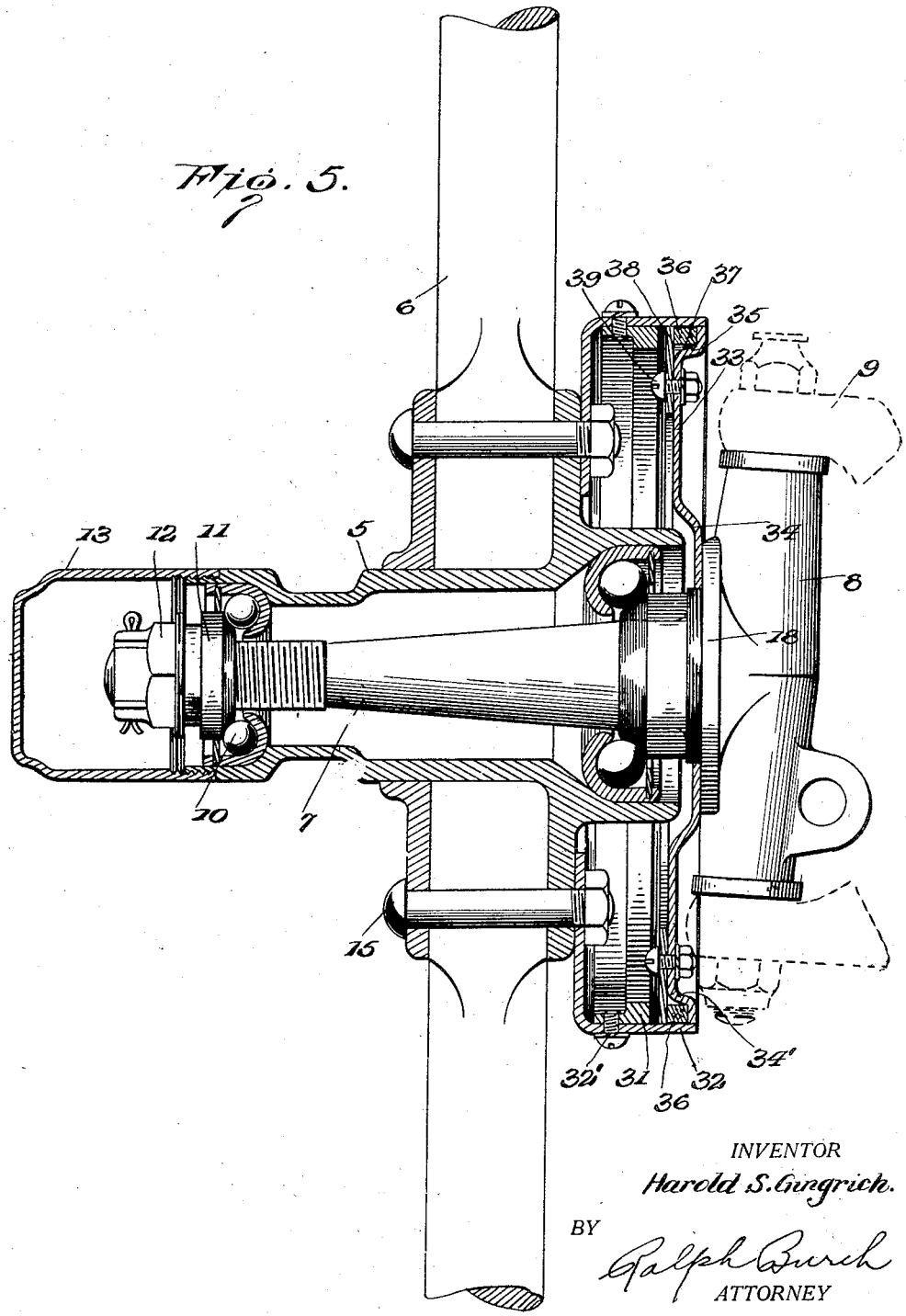

Patented Dec. 16, 1924.

1,519,537

UNITED STATES PATENT OFFICE.

HAROLD S. GINGRICH, OF DETROIT, MICHIGAN.

SPEEDOMETER DRIVE.

Application filed November 28, 1923. Serial No. 677,424.

*To all whom it may concern:*

Be it known that HAROLD S. GINGRICH, citizen of the United States, residing at Detroit, in the county of Wayne and State of Michigan, has invented certain new and useful Improvements in Speedometer Drives, of which the following is a specification.

My invention relates to improvements in speedometer drives and more particularly to the type of drive attachable to the front wheel of a vehicle.

The primary object of the invention is to provide a housing for the drive to protect the gears from foreign matter such as dirt, stones, and water, insuring smooth and uninterrupted operation of the gears at all times.

A further object of the invention is to provide a drive having a housing enclosing the drive and pinion gears and means for shifting the pinion gear out of mesh with the drive gear, to render the drive inoperative.

Another object of the invention is to provide a device of the above character which is simple and durable in construction, reliable and efficient in operation, accessible for repairs and inexpensive to manufacture.

Other objects and advantages of the invention will be apparent during the course of the following description.

In the accompanying drawings forming a part of this specification and in which like numerals are employed to designate like parts throughout the same, Fig. 1, is a sectional elevation of the preferred form of my invention, Fig. 2, is a perspective view of the same, Fig. 3, is a side elevation with parts broken away to show the connection between the gears, Fig. 4, is a side elevation with parts broken away showing a modified form of my invention, and, Fig. 5, is a sectional elevation of the modified form.

Referring to the drawings, wherein for the purpose of illustration I have shown a preferred embodiment of my invention, the numeral 5 designates the hub of a vehicle wheel 6, mounted on the usual spindle 7 which forms a part of the steering knuckle 8 pivotally mounted in the yoke 9 of the vehicle axle. The hub is fitted with the usual ball bearings 10 held in place by the adjusting cone 11 and lock nut 12 and a hub cap 13 covers the end of the hub enclosing the spindle. This construction is of conventional type and is merely shown for illustrative purposes.

In Figs. 1, 2 and 3, a preferred form of my invention is shown and as shown in Fig. 1, a spur gear 14 is rigidly attached to the wheel hub 5 by the wheel flange bolts 15 which pass through the flange 16 cast integral with the gear. The spur gear 14 is adapted to revolve with the vehicle wheel and is enclosed by a stationary circular drum 17 riveted or welded to the annular flange 18 cast integral with the steering knuckle 8. The portion of the drum adjoining the flange is slightly depressed, as at 18', providing a communicating passage between the hub and drum, through which lubricant may be supplied to the gear. An annular washer of any suitable material is seated in a recess 20 formed along the edge of the gear 14, being held in place by a retaining ring 21 interposed between the gear flange 16 and hub flange 21'. A flat spring 22 is interposed between the recess 20 and the washer 19, pressing the latter against the drum, taking up the wear and affording a tight fit at all times.

As more clearly shown in Figs. 2 and 3, the peripheral edge of the drum 17 is provided with an opening covered by a substantially U-shaped housing 23 attached to the drum by bolts 24. The housing encloses a pinion gear 25 journaled in the cover plate 26. The cover plate is secured to the housing by set screws 27 passing through slots 28, whereby the cover may be longitudinally adjusted, by loosing the screws, to shift the pinion gear in or out of mesh with the spur gear. The pinion gear 25 is connected with a flexible shafting 29 leading to the speedometer, not shown, through the medium of a swivel joint held in place by the clamp 30.

In Figs. 4 and 5, a modified form of my invention is shown, in which I have substituted an annular gear with inside teeth for the spur gear and placed the pinion gear inside the drum. The annular gear 31 is centrally secured within a drum 32 by bolts 32'. The drum is rigidly attached to the hub 5 through the medium of the hub flange bolts 15 and revolves therewith. The open side of the drum is covered with a stationary pressed steel disk 33 riveted or welded to the flange 18. The inner and outer edges of the disk 33 are off-set, as at 34 and 34', the latter forming a shoulder 35 which provides a seat for the annular washer 36. The inner off-set 34, provides a passage between the hub and drum through which lubricant may pass. A flat spring 37 is interposed between the shoulder 35 and washer 36 pressing the latter firmly against the drum to afford a tight fit between the cover and drum. The washer 36 is held seated by the annular retaining ring 38 attached to the inner side of the disk 33, by bolts 39.

As more clearly shown in Fig. 4, the pinion gear 40 is mounted within the drum 32 through an opening in the disk 33, and is positioned to mesh with the annular gear 31. The pinion gear is journaled in the bearing plate 41 covering the opening and riveted to the outer side of the disk. The gear is connected to the flexible shafting 29 leading to the speedometer, not shown, through the medium of a swivel joint held in place by the clamp 42.

Thus, it will be seen, that in operation the drive gear revolves with the vehicle wheel and the movement of the drive gear is imparted to the speedometer through the medium of the pinion gear and flexible shafting. To protect the gears against foreign matter likely to interfere with their operation, the gears are completely enclosed by a casing, so constructed that a tight fit is established between the moving parts and stationary parts. Furthermore, the casing is designed so the pinion gear may be shifted out of mesh with the drive gear to render the drive inoperative, and may be readily taken apart to make necessary repairs.

It is to be understood that the forms of my invention herewith shown and described are to be taken as a preferred example of the same, and that certain changes in the shape, size, and arrangement of parts may be resorted to without departing from the spirit of the invention or the scope of the subjoined claims.

Having thus described my invention, I claim:—

1. In a speedometer drive, the combination with a rotatable driving member, of a drive gear attachable to said driving member, a stationary drum enclosing said drive gear having an opening through its peripheral edge, a housing covering said opening having an adjustable cover, and a pinion gear journaled in said cover and normally meshing with said drive gear.

2. A speedometer drive including a drive gear, a drum enclosing said drive gear, a pinion gear driven by said drive gear, a housing carried by said drum enclosing said pinion gear, a cover slidably associated with said housing, said pinion gear being journaled in said cover, and means for adjusting said cover to shift said pinion gear in and out of mesh with said drive gear.

3. A speedometer drive including a drive gear, a drum enclosing said drive gear having an opening through its peripheral edge, a housing covering said opening, and a pinion gear journaled in the wall of said housing, said wall being movable to adjust said pinion gear with respect to said drive gear.

4. A speedometer drive including a drive gear, a drum enclosing said drive gear having an opening through its peripheral edge, a housing covering said opening having a movable wall, and a pinion gear within the housing carried by said movable wall and adapted to normally mesh with said drive gear.

5. A speedometer drive including a drive gear, a drum enclosing said drive gear having an opening through its peripheral edge, a pinion gear meshing with said drive gear through said opening, a housing covering said opening and enclosing said pinion gear, a cover movably associated with said housing, said pinion gear being journaled in said cover and adjusting screws extending through slots in said cover to permit adjustment of said pinion gear.

In testimony whereof I affix my signature.

HAROLD S. GINGRICH.